No. 732,017. PATENTED JUNE 23, 1903.
S. B. WHITESIDE.
DEVICE FOR TENSIONING WHEELS.
APPLICATION FILED OCT. 27, 1902.
NO MODEL. 2 SHEETS—SHEET 1.
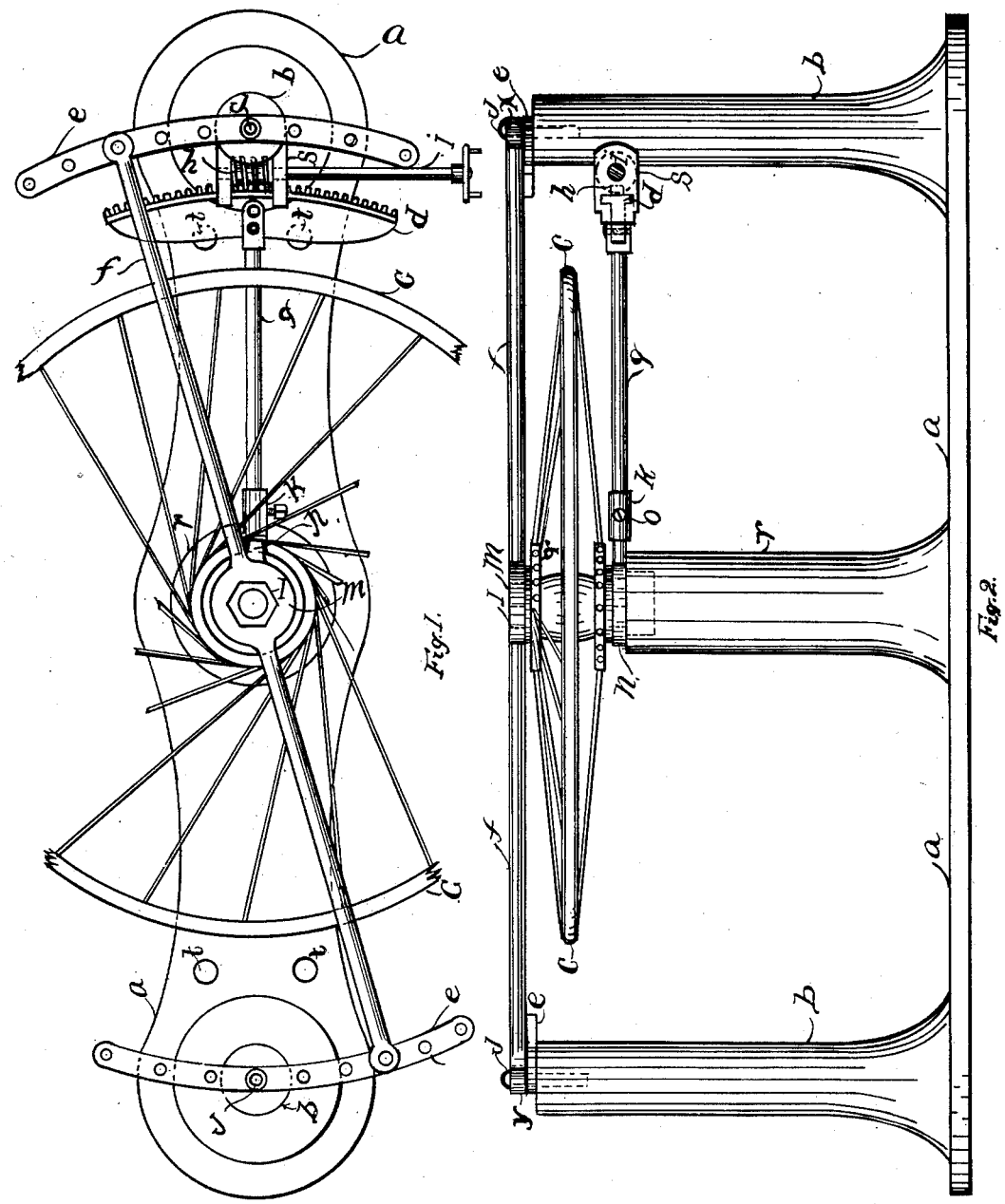

No. 732,017. PATENTED JUNE 23, 1903.
S. B. WHITESIDE.
DEVICE FOR TENSIONING WHEELS.
APPLICATION FILED OCT. 27, 1902.
NO MODEL. 2 SHEETS—SHEET 2.
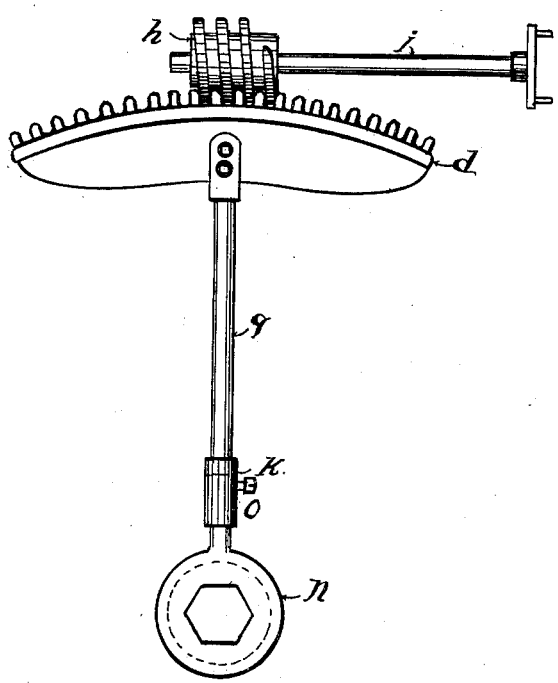
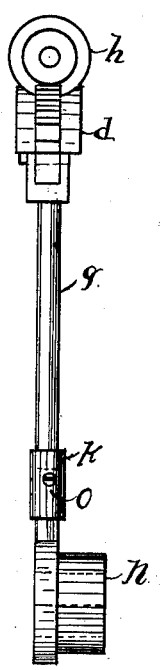
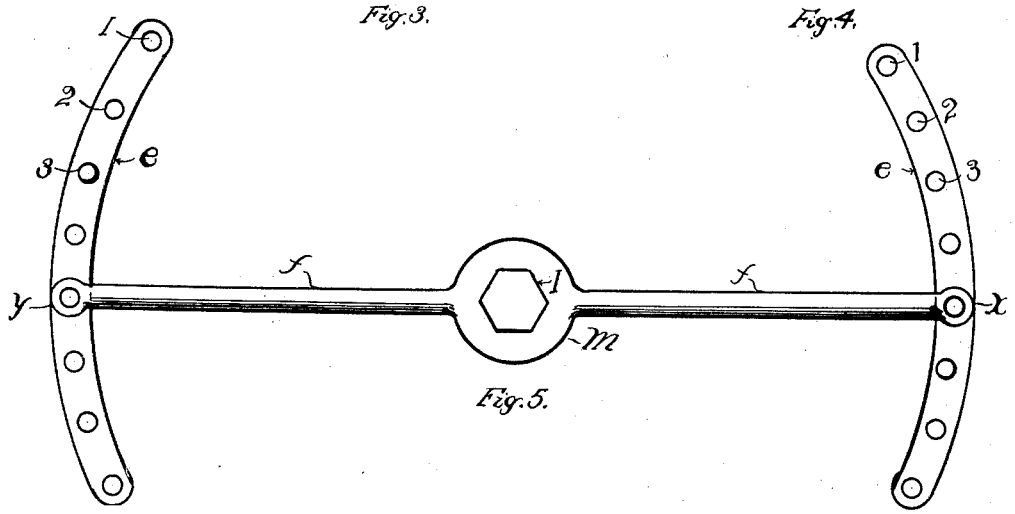
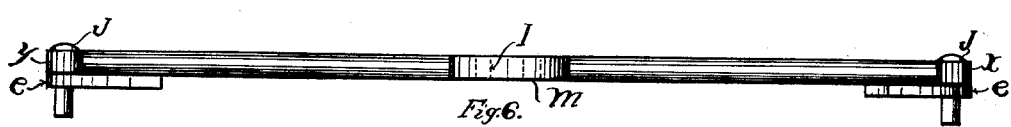

No. 732,017. Patented June 23, 1903.

UNITED STATES PATENT OFFICE.

SIDNEY B. WHITESIDE, OF GRAND RAPIDS, MICHIGAN, ASSIGNOR TO WHITESIDE WHEEL COMPANY, OF GRAND RAPIDS, MICHIGAN.

DEVICE FOR TENSIONING WHEELS.

SPECIFICATION forming part of Letters Patent No. 732,017, dated June 23, 1903.

Application filed October 27, 1902. Serial No. 128,966. (No model.)

*To all whom it may concern:*

Be it known that I, SIDNEY B. WHITESIDE, a citizen of the United States, residing at Grand Rapids, in the county of Kent and State of Michigan, have invented new and useful Improvements in Devices for Tensioning Wheels, of which the following is a specification.

This invention pertains to a device for tensioning those wheels in which the hub is suspended within the rim upon spokes under tension; and it consists in means for giving the proper tension to the spokes of such a wheel as is shown in the accompanying drawings.

In the drawings, Figure 1 is a top plan view of the device, showing a portion of the wheel in position. Fig. 2 is a side elevation of the device, also showing the wheel in the same position. Fig. 3 is a top plan view of the tensioning device. Fig. 4 is a side elevation of the same parts shown in Fig. 3. Fig. 5 is a top plan view of the top wrench and the attached parts. Fig. 6 is a side elevation of the same parts shown in Fig. 5.

The wheel shown in the drawings forms the subject of other applications for patents now pending, and as it constitutes no part of this invention I do not show it in detail. It consists, essentially, of a rim, a hub divided into two parts transversely of the axis of the hub, two sets of spokes extending tangentially to the hub from the respective parts of the hub at opposite angles to the rim, and a locking device for clamping the two parts of the hub in position after they have been rotated with respect to each other. The rim bears suitable holes for the insertion of the spokes, which are made of wire, the spokes having upon the outer end a suitable head, so they will not pass through the holes in the rim. The inner or hub ends of the spokes are hooked or bent, and the respective portions of the hub are provided with a series of holes to receive the hooked ends of the spokes. This portion of the hub having such holes is shown by $q$ in Fig. 2.

This device is carried upon a base or frame $a\ a$, which should be firmly supported. For this purpose bolts attaching it to the floor may be passed through holes $t\ t$ in the baseplate. At each end of the device is a standard $b$, suitably connected with the frame, and the frame also carries the standard $r$, intended to support the hub of the wheel. The standards $b\ b$ may be erected in any desired form or position so long as they support and hold the upper wrench firmly, as herein described. The standard $r$ is hollow or bored out at the upper end in order to receive the wrench $n$, which is shown in detail in Figs. 3 and 4. This wrench is of suitable form, so that its lower portion will drop into the socket provided in the upper part of the standard $r$ and will turn therein. The inner portion of the wrench is hexagonal or of suitable form to grip a nut upon the hub. The wrench also has a short stem or handle, which in Figs. 3 and 4 is shown entering the sleeve $o$ upon the arm $g$. The set-screw $k$ permits longitudinal adjustment of the wrench-stem in this sleeve and allows the same to be clamped and rigidly fastened at any desired spot.

The upper wrench is shown in detail in Figs. 5 and 6. It consists of a main bar $f f$, carrying in its central portion the wrench part $m$, which has a central hexagonal opening $l$, adapted to grip a nut upon the upper part of the hub. The ends of the bar $f f$ are adapted to be fastened to the standards $b\ b$. In the form of the device shown in the drawings these standards are shown opposite to each other, and the bar $f f$ is therefore straight. At each end of the bar $f f$ I provide an arm or T-head $e$ in the shape of the arc of a circle, the same being preferably a flat bar and provided with a series of holes 1 2 3. Bolts $j\ j$ are adapted to drop down through the holes $x\ y$ in the ends of the bar $f f$ and through the registering holes in the head $e$ and enter corresponding holes or openings in the top of the standards $b\ b$, as shown by the dotted lines in Fig. 2. This T-head may be made integral with the bars $f f$, if desired. This construction permits considerable latitude of position to the wrench-bar $f f$. It may lie directly across the center of the device, as indicated by Fig. 5, or for convenience it may be placed diagonally of the center line, as shown in Fig. 1. It may be located in any of its various positions as the convenience of operation requires.

I attach to the frame or standard in any suitable manner the bracket $s$. In the form which I have illustrated I have shown this bracket attached to one of the standards. This bracket carries in suitable bearings rotatable shaft $i$, to which rotation is given by the hand-wheel. (Shown in Figs. 1 and 3 as attached to the shaft.) The shaft also carries the worm $h$. It also carries the toothed segment or rack $d$, the teeth upon the rack being in the arc of a circle of suitable size. The worm carried by the shaft intermeshes with the teeth upon this rack, and this causes the same to move in a circular way along the arc of the circle. This rack is supported in and travels in a groove of suitable shape in the bracket $s$, as is shown more in detail in Fig. 2. The arm $g$ is rigidly attached to this rack and becomes the radius of the circle, shifting its position as the rack is moved.

In the use of this device the top wrench is first entirely removed or swung to one side. The rim is then held in any suitable way, while the spokes are threaded through the rim and the interior hooked ends of the spokes engaged with the holes in the respective halves of the hub. The wheel then rests upon the hub-support $r$, and the nut upon the lower portion of the hub is held within and gripped by the lower wrench $n$. The upper wrench is then placed in position, its ends being attached to the supporting-standards and its central wrench portion holding and gripping a nut upon the upper portion of the hub. The shaft $i$ is then rotated in any suitable way, and thereby the arm $g$, connected with and holding the lower wrench $n$, is also moved. The upper half of the hub is held rigidly against any possible rotation, and the rotation of the lower half is continued until the desired strain is obtained upon all the spokes. When this is done, the selected clamping device is applied to retain the two portions of the hub in their proper respective positions. The attachment is then released by a slight backward motion of the lower wrench, the upper wrench is removed, and the completed wheel taken out.

I have shown this device in horizontal form adapted to receive a wheel which was in process of manufacture and was not in position upon an axle. It is apparent that the device could be turned upon one side and applied to a wheel in its vertical position.

Having thus described my invention, what I claim to have invented, and desire to secure by Letters Patent of the United States, is—

1. In a device for tensioning wheels means for supporting the hub, a lower wrench and an upper wrench, means for rigidly maintaining one wrench so as to prevent rotation of that portion of the hub, and means for turning the other wrench, thereby rotating the two parts of the hub with reference to each other and giving the desired tension to the spokes, substantially as described.

2. In a device for tensioning wheels, a supporting-frame, the lower wrench, the upper wrench, the bars for holding the upper wrench rigidly, the lever for rotating the lower wrench, and means for operating such lower lever, substantially as described.

3. In a device for tensioning wheels a supporting-frame, a wrench for gripping and holding one portion of the hub, means for holding such wrench in rigid relation to the frame, a wrench for gripping and turning the other portion of the hub, and means for turning such wrench, substantially as described.

4. In a device for tensioning wheels a supporting-frame, a wrench for gripping and turning one portion of the hub, means for turning such wrench, a wrench for gripping and holding the other portion of the hub, and means for varying the position of such rigid wrench with respect to the other parts of the device, substantially as described.

5. In a device for tensioning wheels a supporting-frame, a wrench for gripping and holding one portion of the hub, a wrench for gripping and turning the other portion of the hub, means for holding the former wrench in rigid relation to the frame, and means carried by the frame for imparting a rotating motion to the latter wrench, substantially as described.

In testimony whereof I have hereunto set my hand in presence of two subscribing witnesses.

SIDNEY B. WHITESIDE.

Witnesses:
A. C. DENISON,
MARY S. TOOKER.